T. J. CLOSE.
SHOCK ABSORBER.
APPLICATION FILED MAY 10, 1918.
1,324,338.
Patented Dec. 9, 1919.
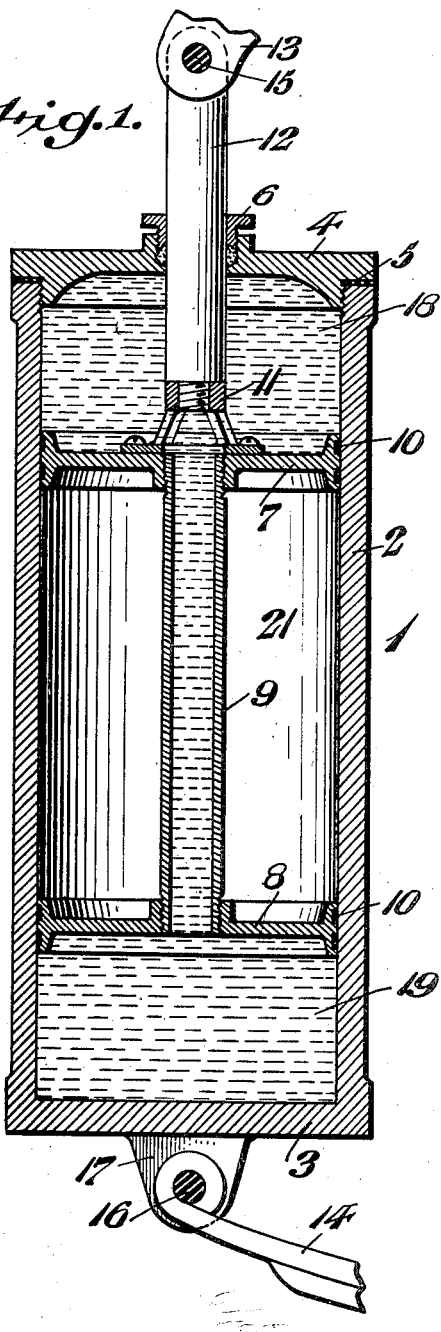
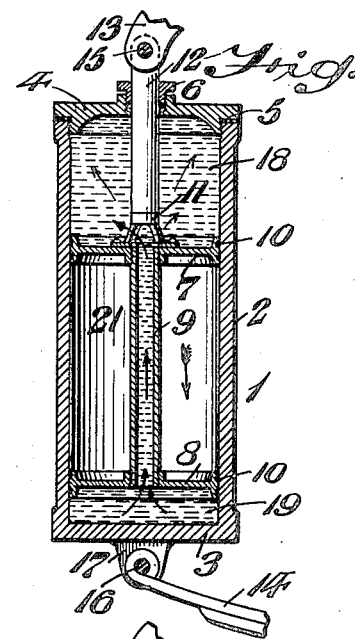
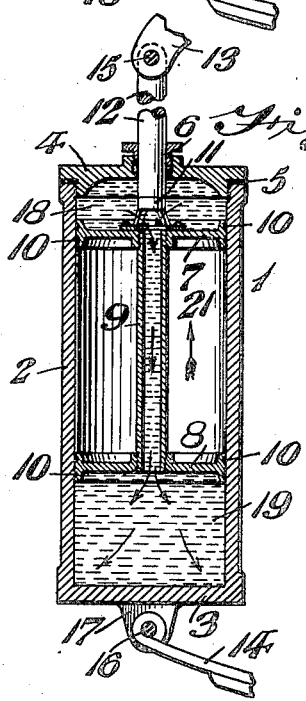
INVENTOR
Thomas J. Close.
BY
ATTORNEYS

UNITED STATES PATENT OFFICE.

THOMAS J. CLOSE, OF PHILADELPHIA, PENNSYLVANIA.

SHOCK-ABSORBER.

1,324,338.  Specification of Letters Patent.  Patented Dec. 9, 1919.

Application filed May 10, 1918. Serial No. 233,645.

*To all whom it may concern:*

Be it known that I, THOMAS J. CLOSE, a citizen of the United States, residing in the city and county of Philadelphia, State of Pennsylvania, have invented a new and useful Shock-Absorber, of which the following is a specification.

My present invention consists of a novel and simplified construction of shock absorber which, although not limited to such use, is especially adapted to be employed in conjunction with automobiles both of the pleasure car and truck type.

It further consists of a novel shock absorber wherein I employ a plurality of spaced plungers having a tubular connecting rod common thereto, said plungers being located within a casing which receives a suitable liquid and is adapted to be connected with one of the parts to be cushioned, such as for example a spring, while the plungers are operatively connected to the other parts to be cushioned, such as for example the vehicle body.

Other novel features of construction and advantage will hereinafter more clearly appear in the detailed description of my invention.

For the purpose of illustrating the invention, I have shown in the accompanying drawings a typical embodiment of it which in practice will give satisfactory and reliable results. It is, however, to be understood that the various instrumentalities of which my invention consists may be variously arranged and organized and that my invention is not limited to the precise arrangement, and organization of these instrumentalities as herein set forth.

Figure 1 represents a sectional elevation of a shock absorber embodying my invention.

Figs. 2 and 3 represent on a reduced scale the construction seen in Fig. 1 but showing the parts in different relations from each other and from that seen in Fig. 1.

Similar numerals of reference indicate corresponding parts.

Referring to the drawings—

1 designates a shock absorber embodying my invention. The shock absorber is provided with a tubular casing 2 one end of which is preferably closed and integral with the side walls of the casing as at 3. The other end of the casing 2 is open and is provided with a closure 4 in threaded engagement with the tubular casing or body portion 2. A packing 5 is preferably interposed between the closure 4 and the casing 2 and the closure 4 carries a stuffing box 6 of any desired type. 7 and 8 represent, respectively, the plungers which are connected by means of a tubular piston or connecting rod 9 which as illustrated is in threaded engagement with such plungers. I provide means such as for example piston rings 10 to prevent leakage around the plungers. The upper plunger 7 has secured thereto in any desired manner the spider 11 to which is connected a rod 12 which passes through the stuffing box 6. 13 and 14 represent respectively the parts to be cushioned, the part 13 being pivotally connected as at 15 with the rod 12, and the part 14 being pivotally connected as at 16 with the ears 17 carried by the closed wall of the casing 2. The plungers and their adjuncts are placed in the casing 2 and the liquid is then placed within the casing and passes through the tubular connection 9 so that a volume of shock absorbing liquid is received in an upper shock absorbing chamber 18 and a lower shock absorbing chamber 19.

In the operation of my device it will be seen that as the plungers move downwardly due to an increase in shock or load strain, the liquid such as for example, oil, in the chamber 19 will gradually pass through the restricted passage in the connection 9 into the upper chamber 18 and on the rebound the oil will slowly pass from chamber 18 through the common connection 9 into the lower chamber 19.

It will be understood that in accordance with the load and the size of the chambers 18 and 19 respectively, I determine the proper width of the bore of the connection 9 so that any desired cushioning effect will be obtained. The chamber 21 formed between the plungers preferably does not contain any liquid.

It will now be apparent that I have devised a novel and useful construction of a shock absorber which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:—

1. In combination with two parts to be cushioned, a tubular casing having its ends closed, a plurality of spaced plungers in said casing forming therewith an upper and a lower liquid receiving chamber, a tubular connection having its ends connected to said plungers to substantially space them from each other and to form a free and uncontrolled communication between said chambers, means to connect one of said plungers with one of the parts to be cushioned, and means to connect said casing with the other part to be cushioned, 2. In a shock absorber, a tubular casing having its ends closed, a pair of spaced plungers in said casing and contributing with said casing to form a liquid receiving chamber at each of its ends, a tubular rod having its ends connected to said plungers to form the sole connection between them to substantially space them from each other and to form an uncontrolled communication between said chambers, a rod connected with said plungers and passing through one end of said casing, and means to connect said casing and said last named rod to the parts to be cushioned.

3. In a shock absorber, a casing, spaced plungers in said casing, forming an upper, a lower and an intermediate chamber, a tubular connection secured at its ends to said plungers to form an uncontrolled communication between said upper and lower chambers and preventing fluid passing between said intermediate chamber and the upper and lower chambers, means to secure said casing to one of the parts to be cushioned, and means operatively connected with one of said plungers to operatively connect them with the other part to be cushioned.

THOMAS J. CLOSE.

Witnesses:
H. S. FAIRBANKS,
C. D. McVAY.